(12) United States Patent
Lorenz et al.

(10) Patent No.: US 6,205,350 B1
(45) Date of Patent: Mar. 20, 2001

(54) MEDICAL DIAGNOSTIC METHOD FOR THE TWO-DIMENSIONAL IMAGING OF STRUCTURES

(75) Inventors: Christian Lorenz; Jürgen Weese, both of Hamburg (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/251,681

(22) Filed: Feb. 17, 1999

(30) Foreign Application Priority Data

Feb. 18, 1998 (DE) .............................. 198 06 728

(51) Int. Cl.$^7$ ...................................... A61B 5/05
(52) U.S. Cl. .......................... 600/425; 345/424
(58) Field of Search ..................... 600/407, 408, 600/410, 424, 425, 440, 443; 345/88, 425, 424, 419

(56) References Cited

U.S. PATENT DOCUMENTS 5,630,034 * 5/1997 Oikawa et al. ..................... 345/424
6,100,862 * 8/2000 Sullivan ............................. 345/88

OTHER PUBLICATIONS

"Computer Assisted Radiology" in CAR '96, Paris, pp. 260–265 (1996).

"Image Processing for Computer–Aided Diagnosis of Lung Cancer by CT (LSCT) in Systems and Computers in Japan", vol. 25, No. 2 1994, pp. 67–80.

"Multi–scal line segmentation with automatic estimation of width contrast and tangential direction in 2D and 3D medical images" by C. Lorenz et al. In Computer Vision, Virtual Reality and Robotics in Medicine CVRMed and MRCAS 199. Lecture Notes in Computer Science 1205 (Springer Verlag, Berlin, 1997) p. 233–242.

* cited by examiner

Primary Examiner—George Manuel
(74) Attorney, Agent, or Firm—John F. Vodopia

(57) ABSTRACT

The invention relates to a medical diagnostic method in which a two-dimensional image can be derived from a data set representing a three-dimensional examination zone while especially emphasizing given structures. The data set is subjected to a filtering operation and from the voxels which are projected onto the same pixel in the two-dimensional image a voxel is selected in dependence on its image value in the second data set. This voxel is reproduced with its original image value in the two-dimensional image.

9 Claims, 2 Drawing Sheets

MEDICAL DIAGNOSTIC METHOD FOR THE TWO-DIMENSIONAL IMAGING OF STRUCTURES

BACKGROUND OF THE INVENTION

1. Field of the Invention

The invention relates to a medical diagnostic method for the two-dimensional imaging of structures present in an object, which method includes the steps of acquiring a first data set from the object in order to define voxel image values for the voxels within a three-dimensional examination zone, generating a second data set from the first data set by a filtering operation which emphasizes the structures. The invention also relates to a system for carrying out the method as well as to an associated image processing method.

2. Description of Related Art

In this context a voxel is to be understood to mean a volume element in the three-dimensional examination zone and a pixel is an image element of the two-dimensional image. A voxel image value is a numerical value which is associated with a voxel and characterizes a physical quantity in the relevant voxel, for example the absorption of X-rays or the nuclear magnetization.

A method of this kind is already known from the publication CAR '96, Paris, pp. 260–265 (1996). The known method has a drawback in that, due to the filtering, the two-dimensional images give the observer a rather unusual image impression.

Furthermore, from the magazine "Systems and Computers in Japan", Vol. 25, No. 2, 1994, pp. 67–80, it is known to derive a two-dimensional image for medical diagnostic purposes from a three-dimensional data set by means of a so-called MIP (Maximum Intensity Projection). A MIP takes into account the largest of the image values of the voxels projected onto the same pixel in the two-dimensional image. This method does not provide suitable imaging when the examination zone contains not only the structures to be imaged but also further structures whose image values are in the same range as the image values of the structures to be imaged. In order to solve this problem, according to the known method the zones containing the desired structures are segmented by means of an automatically formed image mask. However, such automatic segmentation, where on the basis of the image values it is decided whether a voxel belongs to a part of the structure or not, can only be done inaccurately; manual segmentation, however, would be very intricate.

SUMMARY OF THE INVENTION

It is an object of the present invention to present a method of the kind set forth in such a manner that the structures to be imaged are not modified but undesirable structures are suppressed in the two-dimensional image.

This object is achieved by taking the following steps:

determining voxels which are projected onto the same pixel in a two-dimensional image, selecting at least one of these voxels in dependence on its voxel image value in the second data set, generating the two-dimensional image, the image value for the pixel then being derived from the voxel image value of the selected voxel in the first data set.

By suitably choosing the filtering method, the voxels reproducing the structures to be imaged can be assigned a different (for example, larger) voxel image value than voxels containing undesirable structures which could be undesirably superposed on the structures to be reproduced in the image. According to the invention, however, such filtering is utilized only for the identification of voxels which are somewhat likely to belong to the structure to be imaged. The imaging of this structure utilizes the original image values (from the first data set) which are associated with these voxels. Consequently, the structures to be reproduced and the undesirable structures can be separated from one another, the structures to be reproduced being imaged with the original image values (or grey values) so that in respect of these structures the two-dimensional image offers the user the normal image impression.

Various possibilities exist as regards the selection of the voxels to be imaged. One possibility corresponds to a MIP, whereas another possibility corresponds to a CVP (Closest Vessel Projection). According to the CVP, the voxels of the structure (for example, of a vascular system) which are situated nearest to the observer are imaged.

In another version the background which is not covered by the structures is suppressed and reproduced, for example in black in the image. A possibility for anatomic orientation is characterized in that a projection image $B_2(u,v)$ is derived from the first data set and that this projection image and the two-dimensional image $B_1(u,v)$ are superposed in an additive manner.

The first data set can be acquired in various ways, for example by means of MR (MR=Magnetic Resonance) or by X-ray CT.

The invention also includes a medical diagnostic image processing method for the two-dimensional imaging of structures in an object which is defined by a first data set with voxel image values for the voxels within a three-dimensional examination zone, which method includes the following steps: a) generating a second data set from the first data set by a filtering operation which emphasizes the structures, characterized in that it also includes the following steps: b) determining voxels (x,y,z) which are projected onto the same pixel (u,v) in a two-dimensional image, c) selecting at least one of these voxels (x,y,z) in dependence on its voxel image value $(F(x,y,z))$ in the second data set, d) generating the two-dimensional image. The invention also includes a medical diagnostic system for the two-dimensional imaging of structures present in an object, including means for the acquisition of a first data set from the object in order to define voxel image values for the voxels within a three-dimensional examination zone, and means for generating a second data set from the first data set by a filtering operation which emphasizes the structures, characterized in that it includes a) means for determining voxels which are projected onto the same pixel in a two-dimensional image, b) means for selecting at least one of these voxels in dependence on its voxel image value in the second data set, c) means for generating a two-dimensional image, the image value $(B_1(u,v))$ for the pixel $(u,v)$ being derived from the voxel image value $(I(x, y, z))$ of the selected voxel in the first data set.

BRIEF DESCRIPTION OF THE DRAWING

The invention will be described in detail hereinafter with reference to the drawings. Therein.

DETAILED DESCRIPTION OF THE PREFERRED EMBODIMENT

Figure 1:
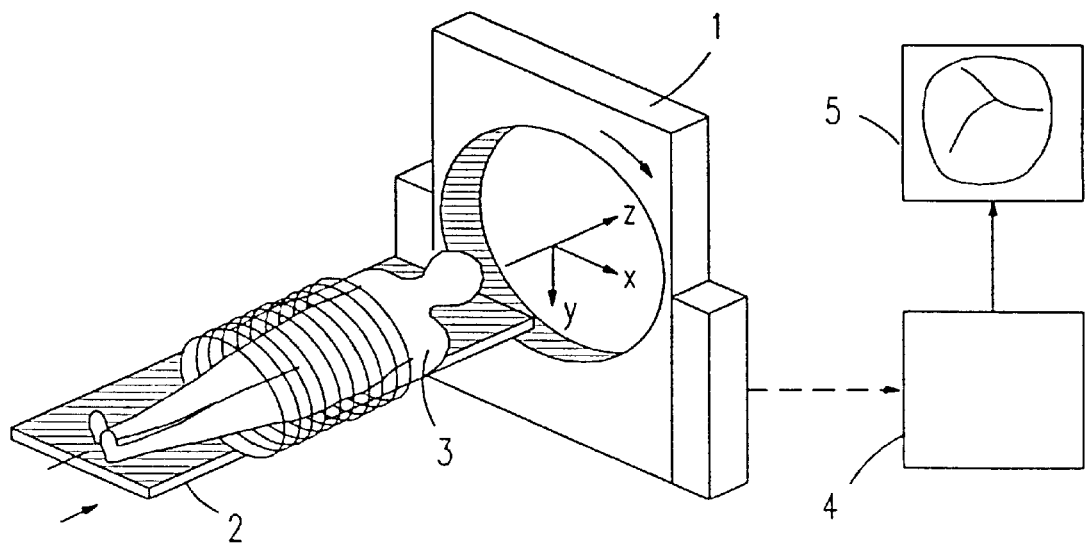
FIG. 1 shows diagrammatically an apparatus in which the invention can be used.

FIG. 1 shows an X-ray computer tomography apparatus 1 for examining a patient 3 who is arranged on a displaceable table top 2. A three-dimensional zone of the patient can thus be examined either by way of a series of parallel, neighbouring slice images or by way of a helical scan during which the table top is continuously displaced in its longitudinal direction (z). This operation yields a first data set I(x,y,z) which represents the absorption of the X-rays in the voxels of the examination zone. This data set is stored and processed in an image processing computer 4 and the two-dimensional image thus formed is displayed on a monitor 5.

The invention can also be used for other examination systems involving the acquisition of a data set which characterizes a given physical parameter in a three-dimensional examination zone, for example an ultrasonic apparatus or an MR apparatus.

Figure 2:
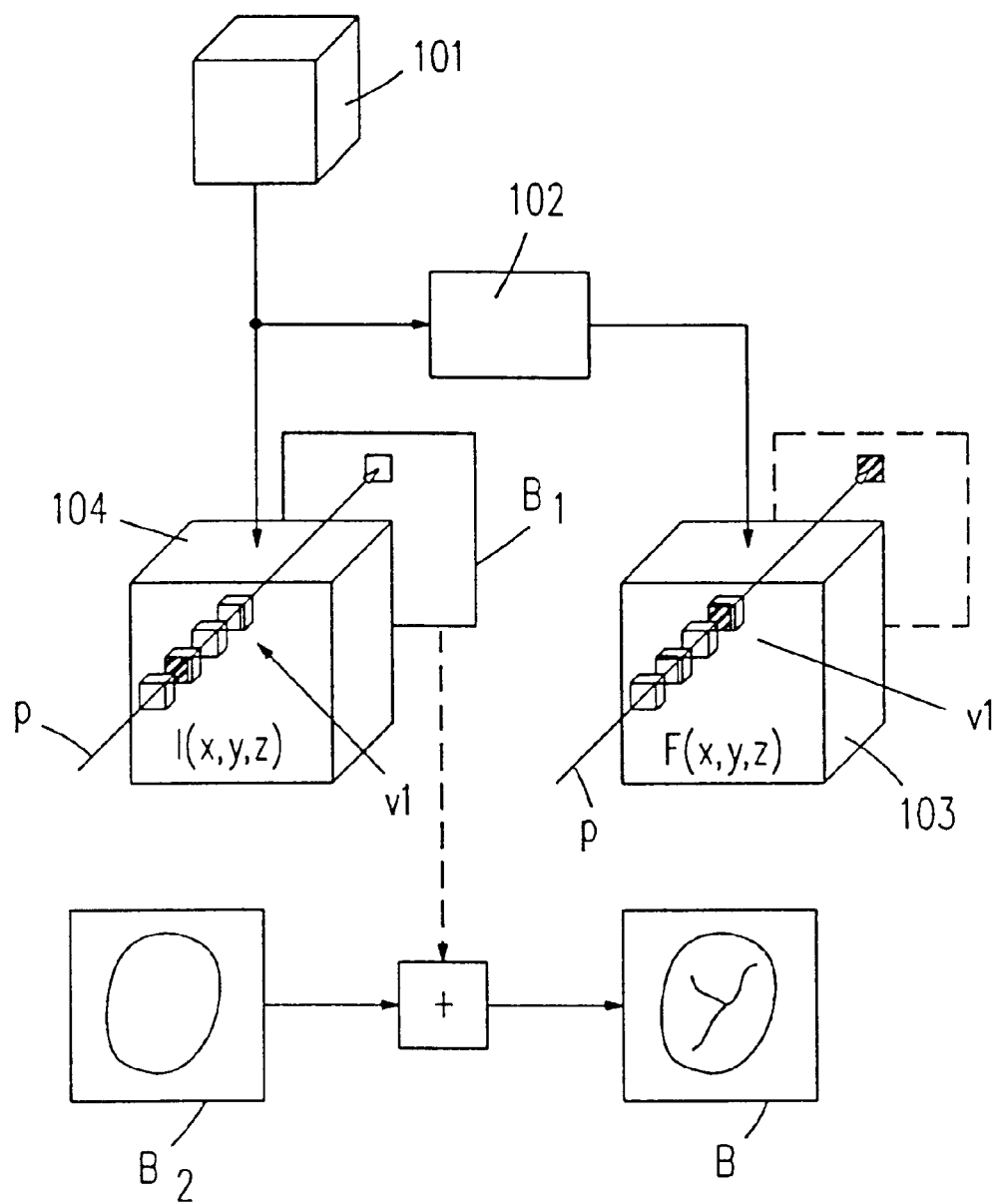
FIG. 2 diagrammatically illustrates the various steps of the method.

The image processing taking place in the image processing computer 4 will be described in detail hereinafter with reference to FIG. 2. The first step 101 represents the described acquisition of the first data set I(x,y,z) which, in the case of an X-ray computer tomography apparatus, defines the absorption of the X-rays as a function of the location x, y, z.

The next step 102 consists in emphasizing the structures to be displayed by means of a filtering operation, thus forming a second data set F(x,y,z) from the first set I(x,y,z). The filtering operation must be aimed at the structures to be reproduced. For example, when a vascular system (possibly filled with a contrast medium) in the body of the patient or electrodes implanted in the skull of the patient are to be imaged, the filtering method is arranged to emphasize line-shaped structures. Such filtering methods are known, for example from CVRMed and MRCAS, Lecture Notes in Computer Science 1205 (Springer Verlag, Berlin, 1997), pp. 233–242.

The voxel image value F(x,y,z) assigned to a voxel x, y, z by the filtering method constitutes a measure of the probability that the relevant voxel belongs to the structure of interest. Hereinafter it will be assumed that a high voxel image value corresponds to a high probability of belonging to the structure of interest.

The next step 103 defines the parameters of a projection whereby the three-dimensional examination zone defined by the first or the second data set is to be converted into a two-dimensional image. The simplest case may involve a parallel projection with a projection direction preferably extending parallel to one of the co-ordinate directions x, y and z. However, central projection is also possible and also a projection with curved projection lines.

Moreover, during the step 103 the voxels are determined which, for the selected projection geometry, are projected onto the same pixel in the two-dimensional image (denoted by a dashed line). For the purpose of illustration the block 103 shows a projection line p with some voxels situated thereon; this line terminates in a pixel of the two-dimensional image which is also situated on the projection line. At least one of these voxels, for example v1, is then selected in dependence of its voxel image value F(x,y,z) in the second data set.

Figure 3A:
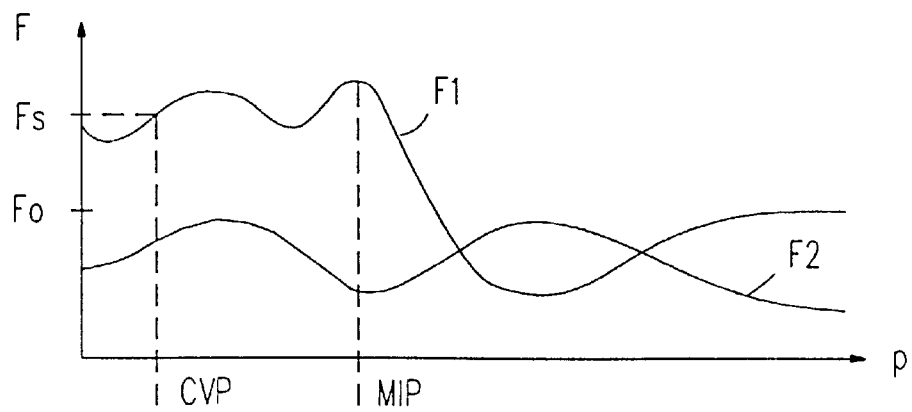
FIG. 3a shows the spatial variation of the image values of the voxels projected onto the same pixel for two different pixels in the second data set.

The selection is illustrated in FIG. 3a in which the variation of the voxel image values F(p) of the second data set F(x,y,z) is shown for the voxels situated on the same projection line p and projected onto the same pixel as two different curves F1, F2 (for two different projection lines). One of the possibilities for selection consists in selecting the voxel having the highest voxel image value, i.e. the highest probability of belonging to the structure of interest; in relation to the second data set F(x,y,z), this corresponds to a MIP. Another possibility consists in selecting that voxel, which has as the first one on the projection line p a voxel image value F(p) above a threshold value Fs; in relation to the second data set, this corresponds to a CVP. However, other selections are also feasible.

Using the selected voxels a two-dimensional image $B_1$ is formed in the step 104. The image value for the pixels of the image $B_1$ is then derived from the previously selected voxels. However, instead of the voxel image value F(p) which is associated with this voxel in the second data set F and which was used to select this voxel, use is made of the voxel image value I(p) which is stored in the first data set for this voxel, so that it is faithfully reproduced in the image $B_1$. This voxel image value may also be smaller than the image values of the other voxels situated on the same projection line.

Figure 3B:
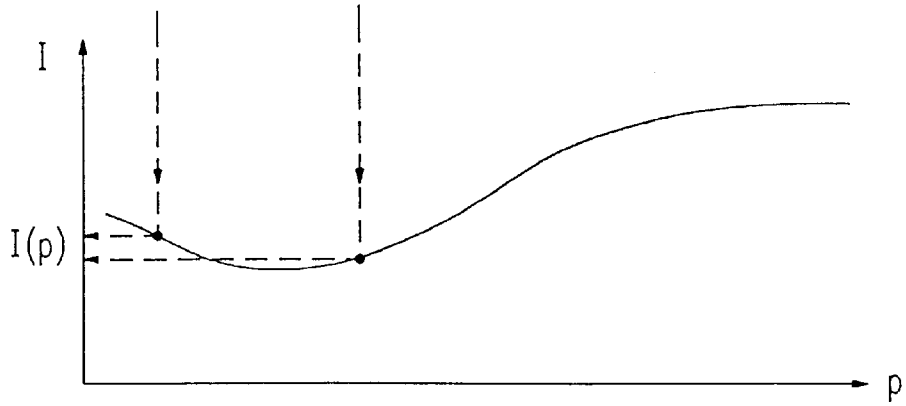
FIG. 3b shows the corresponding variation in the first data set.

The foregoing is also shown in FIG. 3b which represents the spatial variation of the voxel image values I(p) along the projection line p with which the curve F1 is associated in FIG. 3a. The voxel image value I(p) is used which is situated in the same position on the projection line p as the maximum in the second data set or the first value exceeding the threshold value Fs (FIG. 3a).

The method according to the invention ensures that disturbing structures in the examination zone, normally being superposed on the structures of interest by projection, are eliminated because low image values are associated therewith in the second data set F. Despite the filtering of the original data set required for this purpose, the structures to be reproduced appear in the image $B_1$ with their original contrast ratios, because the original (non-filtered or first) data set I is used for the selected voxels instead of the filtered data set F.

If the method according to the invention were also used for the pixels of the image $B_1$ on which no voxel from the structures of interest (image background) is projected, the image value would be derived from a voxel having, for example the largest value F(x,y,z) along the projection line p. Consequently, a more or less random image background could occur outside the structures in the image; such a background could impede the image interpretation. In order to avoid the possibly associated image artefacts, the selection of the voxel (block 103) used for the two-dimensional image $B_1$ can be modified as follows:

a) When the image values F(x,y,z) of voxels along the primary beam, produced by the filtering, exceed a threshold value F0 for at least one voxel, as is the case, for example for the curve F1 in FIG. 3a, one of the voxels is determined and its image value in the first data set is used for the pixel in the image $B_1$ associated with the projection line p as explained above.

b) However, if all voxels along a projection line p have voxel image values F(p) below the limit value Fo, as is the case for the curve F2 in FIG. 3a, a constant image value which is independent of F2 is assigned to the associated pixel. This is because in this case there is only a small probability of an arbitrary voxel along the projection line belonging to the structure of interest. These background image points can be uniformly reproduced in the two-dimensional image $B_1$, for example in white, grey or black.

Even though a quieter, more uniform image background is thus obtained, in given circumstances the anatomic orientation by the operator may become more difficult. In order to facilitate orientation, the two-dimensional image $B_1$ and a standard projection image $B_2$ which has been calculated for the same projection geometry and in which, for example each pixel is assigned the mean value of the image values for the voxels on the projection line p associated with this pixel, are added, so that a character similar to an X-ray image is obtained, in conformity with the relation $$B=B_1+\alpha B_2,$$

where $\alpha$ is a suitably chosen weighting factor and B is the overall image resulting from the superposition of the two images. This is denoted by dashed lines in FIG. 2.

The method according to the invention is suitable for imaging, for example electrodes which are implanted in a skull, without imaging superposed skull bones. However, it is also possible to reproduce coronary vessels filled with a contrast medium, without the ventricles filled with contrast medium being superposed on the vessels. Thus, in both cases line-shaped structures are reproduced; however, other structures can also be reproduced in this manner if they can be emphasized by means of a suitable filtering method.

In the above embodiment the image values for the pixels of the two-dimensional image $B_1$ were always derived exclusively from the voxel image value of each time one voxel. However, it is also possible to select a plurality of voxels and to use their voxel image values, for example the n voxels having the highest image value (n being an integer number larger than 1), or the n successive voxels along the projection line p whose voxel image values yield the highest sum value. Image disturbances due to noise and the like can thus be reduced.

All references cited herein are incorporated herein by reference in their entirety and for all purposes to the same extent as if each individual publication or patent or patent application was specifically and individually indicated to be incorporated by reference in its entirety for all purposes.

What is claimed is:

1. A medical diagnostic method for the two-dimensional imaging of structures present in an object comprising:

acquiring a first data set (I(x,y,z)) from the object in order to define voxel image values for the voxels within a three-dimensional examination zone, generating a second data set (F(x,y,z)) from the first data set by a filtering operation which emphasizes the structures, determining voxels (x,y,z) which are projected onto the same pixel (u,v) in a two-dimensional image, selecting of at least one of these voxels (x,y,z) in dependence on its voxel image value (F(x,y,z)) in the second data set, and generating the two-dimensional image ($B_1$(u,v)), the image value for the pixel (u,v) being derived from the voxel image value (I(x,y,z)) of the selected voxel in the first data set.

2. A method as claimed in claim 1 wherein said selecting step selects the voxel whose voxel image value has an extreme value, notably a maximum, in the second data set.

3. A method as claimed in claim 1 wherein said selecting step selects the voxel to be the first voxel whose voxel image value in the second data set either exceeds or is smaller than a selectable threshold value.

4. A method as claimed in claim 1 wherein a constant image value is assigned to a pixel (u,v) in the two-dimensional image ($B_1$(u, v) if the voxel image values (F(x,y,z)) of the voxels projected onto this pixel either do not exceed or do not become smaller than a selectable threshold value in the second data set.

5. A method as claimed in claim 1 wherein a projection image ($B_2$(u,v)) is derived from the first data set and that this projection image and the two-dimensional image ($B_1$(u,v)) are superposed in an additive manner.

6. A method as claimed in claim 1 wherein the first data set is acquired by means of an MR method.

7. A method as claimed in claim 1 wherein the first data set is acquired by means of an X-ray CT method.

8. A medical diagnostic image processing method for the two-dimensional imaging of structures in an object which is defined by a first data set with voxel image values for the voxels within a three-dimensional examination zone, the method comprising:

generating a second data set from the first data set by a filtering operation which emphasizes the structures, determining voxels (x,y,z) which are projected onto the same pixel (u,v) in a two-dimensional image, selecting at least one of these voxels (x,y,z) in dependence on its voxel image value (F(x,y,z)) in the second data set, and generating the two-dimensional image.

9. A medical diagnostic system for the two-dimensional imaging of structures present in an object comprising:

means for the acquisition of a first data set from the object in order to define voxel image values for the voxels within a three-dimensional examination zone, means for generating a second data set from the first data set by a filtering operation which emphasizes the structures, means for determining voxels which are projected onto the same pixel in a two-dimensional image, means for selecting at least one of these voxels in dependence on its voxel image value in the second data set, and means for generating a two-dimensional image, the image value ($B_1$(u,v)) for the pixel (u,v) being derived from the voxel image value (I(x,y,z)) of the selected voxel in the first data set.

* * * * *